UNITED STATES PATENT OFFICE.

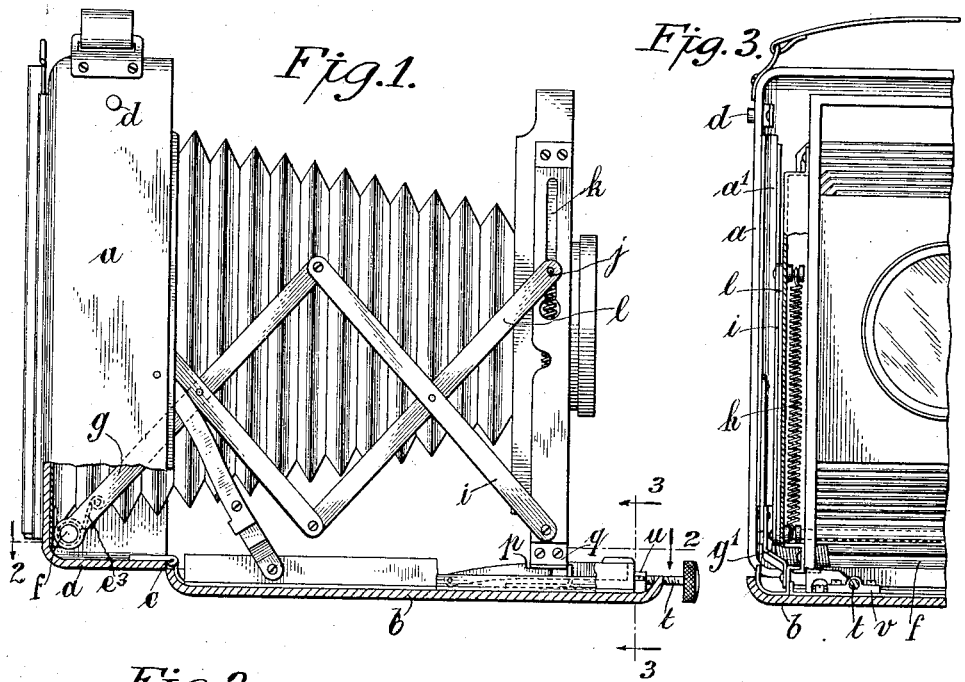
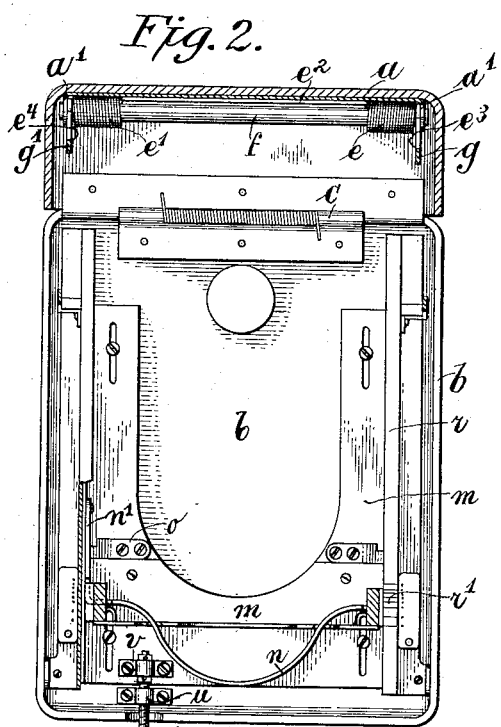
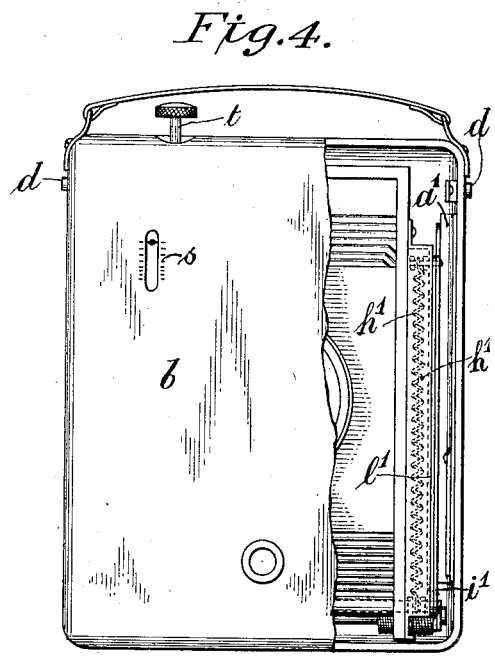

PAUL DIETZ, OF BROOKLYN, NEW YORK, ASSIGNOR TO NEW IDEAS MANUFACTURING COMPANY INC., OF NEW YORK, N. Y.

CAMERA FOR TAKING PICTURES.

1,150,814.   Specification of Letters Patent.   Patented Aug. 17, 1915.

Application filed August 3, 1914. Serial No. 854,608.

*To all whom it may concern:*

Be it known that I, PAUL DIETZ, a citizen of the German Empire, and a resident of Brooklyn, county of Kings, and State of New York, have invented certain new and useful Improvements in Cameras for Taking Pictures, of which the following is a specification.

This invention has reference to improvement in cameras for taking pictures.

It pertains particularly to a camera which opens automatically when a push button is pressed. By this one single operation the entire mechanism is released, the camera opens and the lazy tongs, the bellows and lens supporting mechanism is also moved out automatically to the adjusted focus. In order to get the right focus before the camera is opened a device is provided on the cover having a small scale outside by means of which the operator may be able to adjust the camera for the desired picture and distance, in advance of opening the camera. A similar scale in connection with the adjusting device is provided on the inside so that the camera may also be adjusted when it is opened.

The adjusting mechanism for the right focus comprises a focus plate on the inner surface of the cover which is movable by means of a set screw extending beyond the cover and therefore the position of the set screw is an indicator in itself and shows whether the camera is set for the infinite position. When in the infinite position all distant objects will be clearly shown and if near objects shall be clearly shown the entire lazy tongs mechanism is moved out until the lens is in position for the right focus for nearby objects. If the picture has been taken and the camera is closed the position of the set screw indicates that it still stands out and has to be moved in if the infinite position is desired or for another position.

There are cameras in existence which move out automatically by means of one spring. This movement is strongest and quickest at the start because the spring is at highest tension when the camera opens. A new spring may cause an impact by the movable parts on the stops whereby slight dislocation of parts may result. Furthermore this movement is not reliable when the spring is partly worn out and the lens may not reach the desired position. To overcome this defect the present camera is provided with a spring for initiating and starting the outward movement and a set of separate springs for continuing the said outward movement. In this manner a slow regular and safe outward movement of the camera is effected. If the camera has moved out it may accidentally move in on the lens support or by careless handling when former cameras are used. To prevent this I have provided a lock mechanism on the focus plate which holds the camera in the exact position for the right focus until released.

In order to render the invention entirely clear reference is had to the accompanying drawing in which:

Figure 1 represents in side elevation, partly in section an open camera which embodies in desirable form the present improvements. Fig. 2 is a sectional bottom plan view on line 2—2 of Fig. 1. Fig. 3 is a fragmental front view of the open camera, partly in section, on line 3—3 of Fig. 1. Fig. 4 is a front view of the closed camera, partly broken away.

Similar characters of reference denote like parts in all the figures.

In the drawing $a$ represents the camera casing and $b$ its cover which is attached to the casing by means of a spring actuated hinge $c$. The camera is normally concealed within the casing and the cover may be released by means of the push button $d$. This button, in fact, releases the entire mechanism, and the camera opens automatically. This is effected by the compound action of springs of which one initiates and starts the outward movement of the camera. This spring for instance is located in the rear bottom portion of the casing $a$ and comprises two helical end portions $e$—$e^1$ wound upon a horizontal shaft $f$. The two helical spring portions are connected by a straight wire portion $e^2$. The shaft $f$ carries the rear end portions of the inner lazy tongs members $g$—$g^1$ and its ends extend into superimposed frames $a^1$ attached to the main casing. The ends $e^3$—$e^4$ of the helical spring portions are attached to said end portions of the lazy tongs members $g$—$g^1$. Accordingly this compound spring is tensioned when the camera is moved in. Upon release of the inner mechanism, when the push botton is pressed and after the cover is down the spring on the shaft $f$, being then tensioned, initiates and starts the outward movement of the camera because it forces the lazy tongs members $g$—$g^1$ in an outward direction. The strength of this spring is so selected that it moves the camera but a limited distance and therefore in a gradual manner. In order to continue the outward movement of the camera two vertical springs are provided on the two sides of the lens support. These springs $h$—$h^1$ are permanently secured to the bottom ends of the outer lazy tongs members $i$—$i^1$, while the upper ends are secured each to a little bolt $j$ which passes through a vertical slot $k$ located in the lens support and is secured to the top end of an outer lazy tongs member $l$. It is evident that the springs $h$—$h^1$, being secured to the lazy tongs mechanism as described, will be tensioned when the camera is moved in because the lazy tongs members move upward when the camera closes and thereby carry the springs along which are thus stretched and tensioned. After the horizontal spring $e$ has moved out the camera for a short distance the tensioned springs $h$—$h^1$ complete this outward movement until the lens frame strikes against stops. Thus the outward movement of the camera is effected in a gradual and rather uniform manner because the outward movement is divided into two phases. The start of the outward movement is effected by one horizontal spring and this movement is completed by the two vertical springs, all of which are tensioned by the inward movement of the lazy tongs and the entire camera.

In order to guard against any dislocation of the camera when moved out I have provided a locking device in the front portion of the cover. Within the cover there is a focus plate $m$ to which the locking device is attached. This device comprises a curved strip portion $n$ which has on each inner end a narrow rectangular portion $n^1$. This narrow portion is pivotally secured to the adjoining vertical flange of the focus plate and normally held in a raised position by the leaf spring $o$. When the camera moves out the lower ends of the lens frame travel along the rails on the cover and then pass onto the narrow strips of the locking device and press them down. Each narrow strip $n^1$ has a catch $p$ formed thereon wherein the lower end $q$ of the lens frame lodges. The camera thus is held in fixed position and cannot move until the curved strip portion $n$ of the locking device is pressed down, releasing the bottom ends of the lens frame from the catch whereupon the camera may be pushed in and closed.

The camera when moving slides on rails $r$ which may be provided with a small scale $r^1$. A similar scale $s$ is provided on the outside of the cover in corresponding location. As hereinbefore stated the camera may be adjusted to the desired focus. This device comprises the focus plate $m$ which is adapted to slide on the inner surface of the cover and a set screw $t$ extending beyond the cover and having a nut $u$ secured to the cover and a nut $v$ secured to the focus plate. By turning the set screw in one direction so that it moves outwardly, then the focus plate together with the lens frame and lens is also moved out, and by turning the set screw so that it moves inwardly the focus plate and lens frame and lens are moved inwardly. Thus the set screw in itself is an indicator showing whether the camera is set for the infinite position. The scales $r$—$s$ further indicate the position of the camera and as previously stated the camera may be adjusted when it is open and when it is closed, because one scale is inside and visible when the camera is open, and one scale is outside on the cover permitting of adjusting the camera before opening it.

The advantages of the described adjusting mechanism and locking device are apparent. It does not make any difference how far in or how far out the camera is, because when it is adjusted the focus moves with the other parts.

I claim as my invention:

1. A camera for taking pictures comprising means for automatically initiating and starting the outward movement of the camera and means for automatically completing said outward movement, both means being tensioned by the inward movement of the camera when closing it, and means adapted to adjust the focus both when the camera is closed and when it is open.

2. A camera for taking pictures comprising means for automatically initiating and starting the outward movement of the camera and means for automatically completing said outward movement and locking the camera in the right focus, both means being tensioned by the inward movement of the camera when closing it, and means adapted to adjust the focus both when the camera is closed and when it is open.

3. A camera for taking pictures comprising means for automatically initiating and starting the outward movement of the camera and means for automatically completing said outward movement, both means being tensioned by the inward movement of the camera when closing it, and a set screw extending beyond the cover adapted to move the focus both when the camera is closed and when it is open.

4. A camera for taking pictures comprising means for automatically initiating and starting the outward movement of the camera and means for automatically completing said outward movement and locking the camera in the right focus, both means being tensioned by the inward movement of the camera when closing it, and a set screw extending beyond the cover adapted to move the focus both when the camera is closed and when it is open.

5. A camera for taking pictures comprising lazy tongs, a lens support moved thereby and having vertical slots in its upper side portions, a horizontal helical spring with ends attached to the bottom ends of the inner lazy tongs members, two vertical springs attached one each to the lower outer end of a lazy tongs member, a small bolt connected to the upper end of each vertical spring, passing through a slot in the lens support and connecting with the top end of an outer lazy tongs member, means for locking the camera when moved out, and a set screw adapted to adjust the focus both when the camera is closed and when it is open.

6. A camera for taking pictures comprising a movable cover, means for automatically initiating and starting the outward movement of the camera and means for automatically completing said outward movement, a movable focus plate within the cover having rectangular side flanges, a locking device pivotally mounted on said flanges and extending into a curved outer strip, leaf springs forcing the locking device normally upward, and a set screw adapted to adjust the focus both when the camera is closed and when it is open.

7. A camera for taking pictures comprising a movable cover, means for automatically starting and completing the outward movement of the camera, a movable focus plate within the cover, a camera locking device on said plate, a set screw extending beyond the cover, a nut attached to the cover, a second nut on the movable focus plate, a scale within the cover, and a second scale outside in corresponding position.

8. A camera for taking pictures comprising a movable cover, means for automatically moving out and locking the camera to the right focus, said means being tensioned by the inward movement of the camera when closing it, and an adjusting device for the focus consisting of a movable focus plate within the cover, a set screw passing through the cover, a nut on the cover, a second nut on the movable focus plate, a scale within the cover, and a scale outside in corresponding location.

9. A camera for taking pictures comprising lazy tongs to move the camera, a horizontal helical spring connected to the inner lower ends of said tongs, two vertical springs connected to their outer ends, all tensioned by the inward movement of the camera, a locking device for the camera, and a focus adjusting device extending beyond the camera and having corresponding scales within and outside.

Signed at New York, N. Y., this 30th day of July, 1914.

PAUL DIETZ.

Witnesses:
CHARLOTTE E. KIRCHNER,
IDA E. ROLAND.

Copies of this patent may be obtained for five cents each, by addressing the "Commissioner of Patents, Washington, D. C."